US008891486B1

(12) United States Patent
Vivanco et al.

(10) Patent No.: US 8,891,486 B1
(45) Date of Patent: Nov. 18, 2014

(54) SHARED OFFLOAD VECTORS TO CONTROL DEVICE OFFLOADS BETWEEN WIRELESS CARRIER FREQUENCIES

(75) Inventors: Daniel A. Vivanco, Herndon, VA (US); Yu Zhou, Herndon, VA (US); Shahzada Basharat Rasool, Sterling, VA (US); Muhammad Ahsan Naim, Sterling, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 146 days.

(21) Appl. No.: 13/604,884

(22) Filed: Sep. 6, 2012

(51) Int. Cl.
*H04W 4/00* (2009.01)

(52) U.S. Cl.
USPC .......................................... 370/331

(58) Field of Classification Search
CPC ..... H04W 80/04; H04W 36/18; H04W 80/06; H04W 28/04; H04W 72/04
USPC .......................................... 370/328, 329, 331
See application file for complete search history.

(56) References Cited

U.S. PATENT DOCUMENTS

| 2011/0189997 | A1 | 8/2011 | Tiwari et al. |
| 2011/0223854 | A1* | 9/2011 | Dottling et al. .................... 455/7 |
| 2012/0100847 | A1* | 4/2012 | Rahman ........................ 455/424 |
| 2014/0010086 | A1* | 1/2014 | Etemad et al. ................ 370/235 |

* cited by examiner

*Primary Examiner* — Ronald Abelson

(57) ABSTRACT

In a communication system, a data processing system determines offload vectors for first base station carriers in a first wireless communication network. The offload vectors indicate offload availability per time frame for device offloads from the first base station carriers to second base station carriers in a second wireless communication network. The data processing system determines offload vector similarity among the first base station carriers to group the first base station carriers into a lowest number of carrier groups to maintain the offload vector similarity within the carrier groups above a similarity threshold. The data processing system generates and transfers a data structure that associates the first base station carriers with representative offload vectors for their carrier groups. Wireless communication devices receive and process the data structure to control offloads from the first base station carriers to the second base station carriers.

20 Claims, 7 Drawing Sheets

US 8,891,486 B1

SHARED OFFLOAD VECTORS TO CONTROL DEVICE OFFLOADS BETWEEN WIRELESS CARRIER FREQUENCIES

TECHNICAL BACKGROUND

Wireless communication devices communicate with wireless networks using wireless protocols, such as Long Term Evolution (LTE), Evolution Data Only (EVDO), High Speed Packet Access (HSPA), and the like. In particular, the wireless communication devices and wireless base stations in the networks exchange wireless signals in these protocols over base station carrier frequencies. For example, a wireless communication device may communicate with a first base station in a first wireless network over a first carrier frequency and then communicate with a second base station in a second wireless network over a second carrier frequency. A device offload occurs when the wireless communication device switches from using the first carrier frequency in the first network to using the second carrier frequency in the second wireless network. A specific carrier frequency in use at a particular base station is referred to as a base station carrier.

Typically, the wireless communication device selects the base station carrier to use based on a prioritized carrier list and comparative carrier signal strength. Unfortunately, the carrier list and signal strength may not adequately account for time-of-day and busy hour for the available base station carriers. To provide the additional time-of-day and busy hour control, time-based offload vectors are generated for each base station carrier to control offloads to the other carriers. In the typical network with hundreds or even thousands of base station carriers, this added control requires hundreds or thousands of offload vectors. The transfer of thousands of offload vectors to millions of wireless communication devices consumes a large amount of network resources.

This amount of offload vectors also impacts the individual wireless communication device. The wireless communication device must receive and periodically update the large data set that the multitude of offload vectors requires. The wireless communication device must also store and process this large data set to use the offload vectors. Thus, the amount of offload vectors also consumes a large amount of wireless communication device resources.

TECHNICAL OVERVIEW

In a communication system, a data processing system determines offload vectors for first base station carriers in a first wireless communication network. The offload vectors indicate offload availability per time frame for wireless communication device offloads from the first base station carriers to second base station carriers in a second wireless communication network. The data processing system determines offload vector similarity among the first base station carriers to group the first base station carriers into a lowest number of carrier groups to maintain the offload vector similarity within the carrier groups above a similarity threshold. The data processing system generates and transfers a data structure that associates the first base station carriers with representative offload vectors for their carrier groups. Wireless communication devices receive and process the data structure to control offloads from the first base station carriers to the second base station carriers.

DETAILED DESCRIPTION

Figure 1:
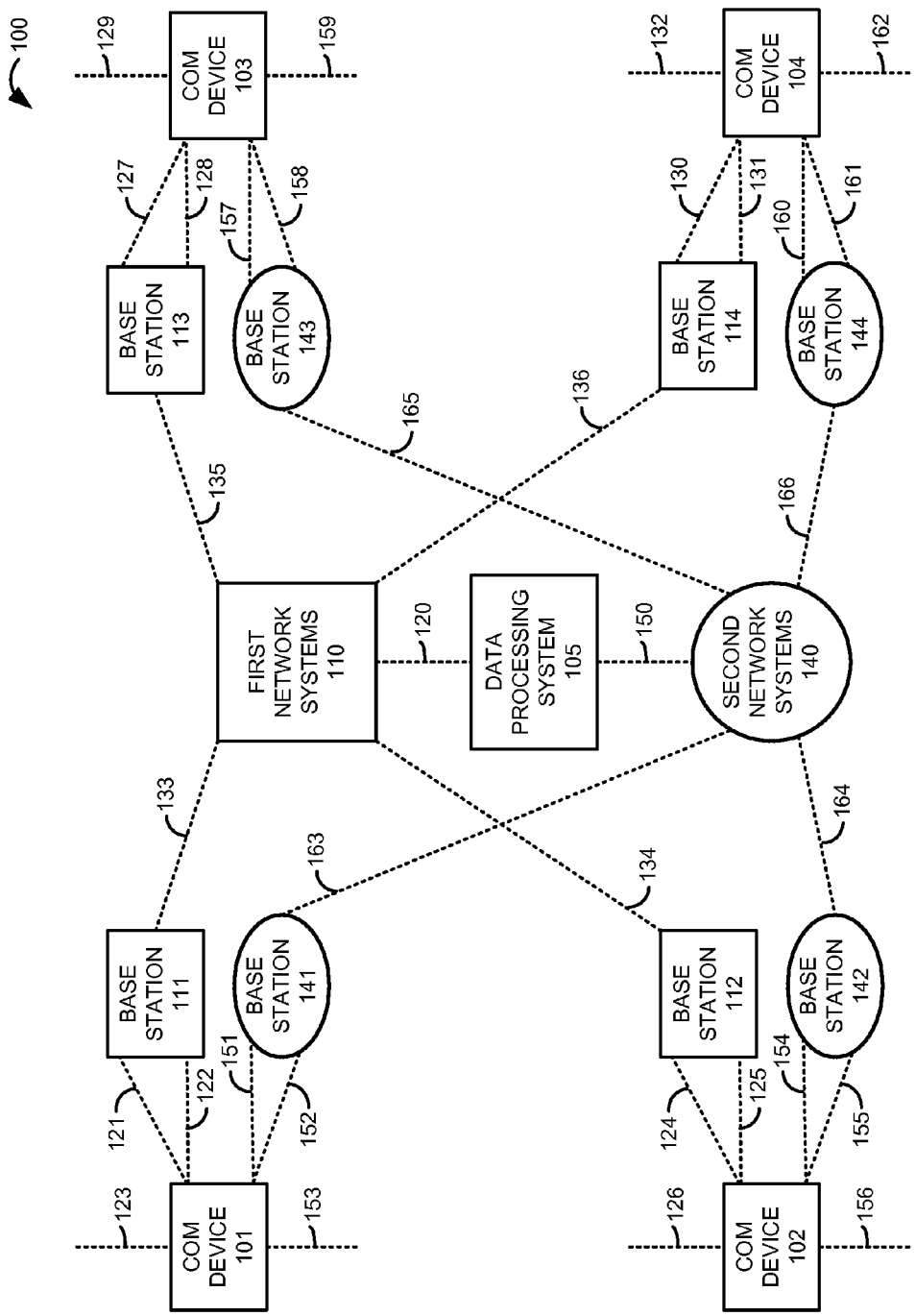
FIG. 1 illustrates a communication system to generate offload vectors that control device offloads between wireless carrier frequencies.

FIG. 1 illustrates communication system 100 to generate offload vectors that control device offloads between wireless carrier frequencies. Communication system 100 comprises: communication devices 101-104, data processing system 105, first network systems 110, first network base stations 111-114, second network systems 140, and second network base stations 141-144. Note that first network systems 110 and wireless base stations 111-114 represent a first wireless communication network, and second network systems 140 and base stations 141-144 represent a second wireless communication network. For example, the first wireless network might comprise various EVDO and/or HSPA systems, and the second wireless network might comprise various LTE systems.

Communication devices 101-104 comprise phones, computers, media players, machine transceivers, and/or some other apparatus having wireless networking components. Communication devices 101-104 wirelessly communicate with base stations 111-114 and 141-144 over base station carriers 121-132 and 151-162. Each base station carrier 121-132 and 151-162 is identified by a combination of base station and frequency band—and perhaps also by sector and carrier channel. For example, base station carrier 121 might use the 1900 MHz frequency band on base station 111, and base station carrier 152 might use the 800 MHz frequency band on base station 141. In another example, base station carrier 127 might use a first carrier channel in the 1900 MHz frequency band on base station 113, and base station carrier 158 might use a second carrier channel in the same 1900 MHz frequency band on base station 143. For clarity, sectors are not depicted on FIG. 1. Base station carriers 121-132 and 151-162 would typically be used within the individual sectors of base stations 111-114 and 141-144. Note that base station carriers are typically available from adjacent sectors in these configurations and would be used along with the carriers depicted on FIG. 1, but these adjacent base station carriers are omitted for clarity.

First network systems 110 and second network systems 140 each comprise computer and communication platforms, such as gateways, servers, signaling processors, and the like. Communication links 133-136 and 163-166 comprise backhaul connections. Communication links 120 and 150 comprise data connections.

Data processing system 105 comprises a computer and communication system that generates offload vectors for communication devices 101-104. Communication devices 101-104 process the offload vectors to control the selection of base station carriers 121-132 and 151-162 based on time and loading. For example, communication device 101 might process an offload vector to switch from base station carrier 122 in the first network to base station carrier 151 in the second network at a time-of-day when carrier 122 is heavily loaded and carrier 151 is lightly loaded. Note that communication system 100 has been simplified for clarity, and that system 100 would typically include a multitude of additional communication devices, base stations, and base station carriers.

In operation, data processing system 105 determines offload vectors for base station carriers 121-132 in the first wireless network. The offload vectors indicate offload availability per time frame for device offloads from first base station carriers 121-132 to second base station carriers 151-162. Data processing system 105 also determines similarity values between the offload vectors in a grouping operation for base station carriers 121-132. The grouping operation identifies the lowest number of carrier groups that maintains the vector similarity within the individual carrier groups above a similarity threshold. The goal is a relatively small number of carrier groups that each has similar offload vectors to allow the carriers in the same carrier group to share one offload vector. If the number of carrier groups is relatively small, then the number of offload vectors that are transferred, stored, and processed by both the wireless network and the wireless device is also relatively small.

Data processing system 105 generates a data structure that associates base station carriers 121-132 with the representative offload vectors for their carrier groups. Data processing system 105 transfers the data structure for delivery to wireless communication devices 101-104. In one example, communication device 102 uses the data structure to offload from base station carrier 124 to base station carrier 155 during a time period when base station carrier 155 is lightly loaded. In another example, communication device 104 uses the data structure to avoid an offload from base station carrier 131 to base station carrier 160 during a time period when base station carrier 160 is heavily loaded.

Figure 2:
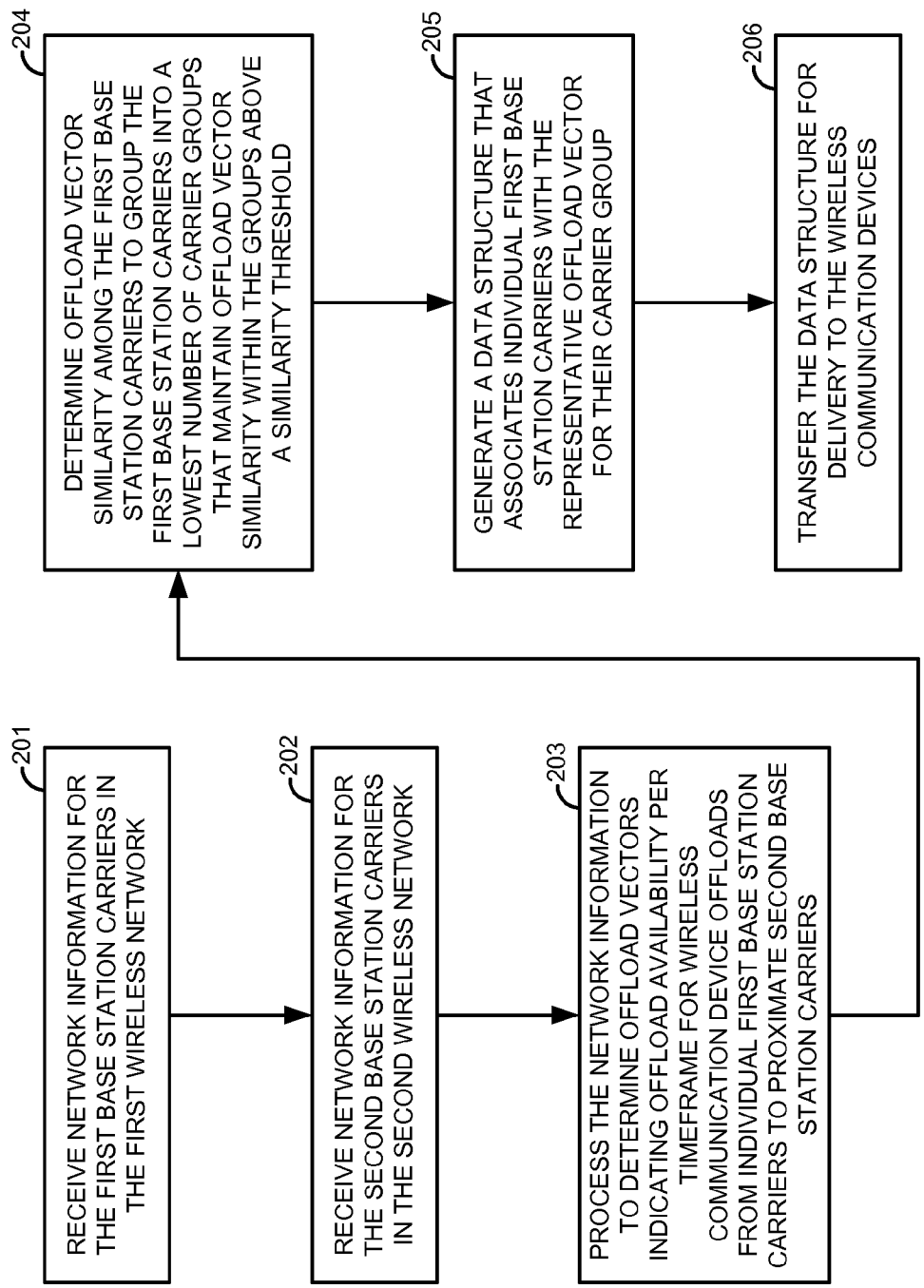
FIG. 2 illustrates the operation of a data processing system to generate offload vectors to control device offloads between wireless carrier frequencies.

FIG. 2 illustrates the operation of data processing system 105 to generate offload vectors that control device offloads between wireless carrier frequencies. Data processing system 105 receives network information for the base station carriers 121-132 from the first wireless network (201). The network information identifies base station carriers 121-132 in association with their locations, ranges, usage metrics, time, date, and/or some other pertinent data. Some of this information, such as location and range, may be pre-configured into system 105. Data processing system 105 also receives similar network information for base station carriers 151-162 from the second wireless network (202).

Data processing system 105 processes the network information to determine offload vectors that indicate offload availability per time frame for offloads from individual base station carriers 121-132 to proximate base station carriers 151-162 (203). For example, system 105 might compare busy hour data between proximate carriers 125 and 154 to identify by hour when offloads from carrier 125 to carrier 154 are desirable, undesirable, or don't matter. Other time increments and loading measures could be used for this comparison as desired.

Data processing system 105 then determines similarity values among the offload vectors to group base station carriers 121-132 into a lowest number of carrier groups that still maintain vector similarity within the groups above a similarity threshold (204). The goal is to find a smallest number of carrier groups that retain sufficient vector similarity within the individual carrier groups. This grouping/similarity approach allows many base station carriers to share a single offload vector and correspondingly reduces the resource consumption in both the wireless network and the wireless device.

Data processing system 105 generates a data structure that associates individual base station carriers 121-132 with the representative offload vector for their carrier group (205). For example, the data structure may include a small set of offload vectors with vector IDs, and the data structure could associate each base station carrier with one of the offload vectors by vector ID. In some scenarios, hundreds of individual base station carriers in a large city might share 5-10 different offload vectors. Thus, the data structure represents a significant reduction in resource consumption over a large table that includes hundreds or thousands of additional offload vectors.

Data processing system 105 transfers the data structure for delivery to wireless communication devices 101-104 (206). This data transfer may include reformatting, store/forward, and other data interface actions. For example, data processing system 105 may load the data structure into a server for subsequent download by communication devices 101-104. Communication devices 101-104 use the data structure to control offloads from base station carriers 121-132 to base station carriers 151-162.

Figure 3:
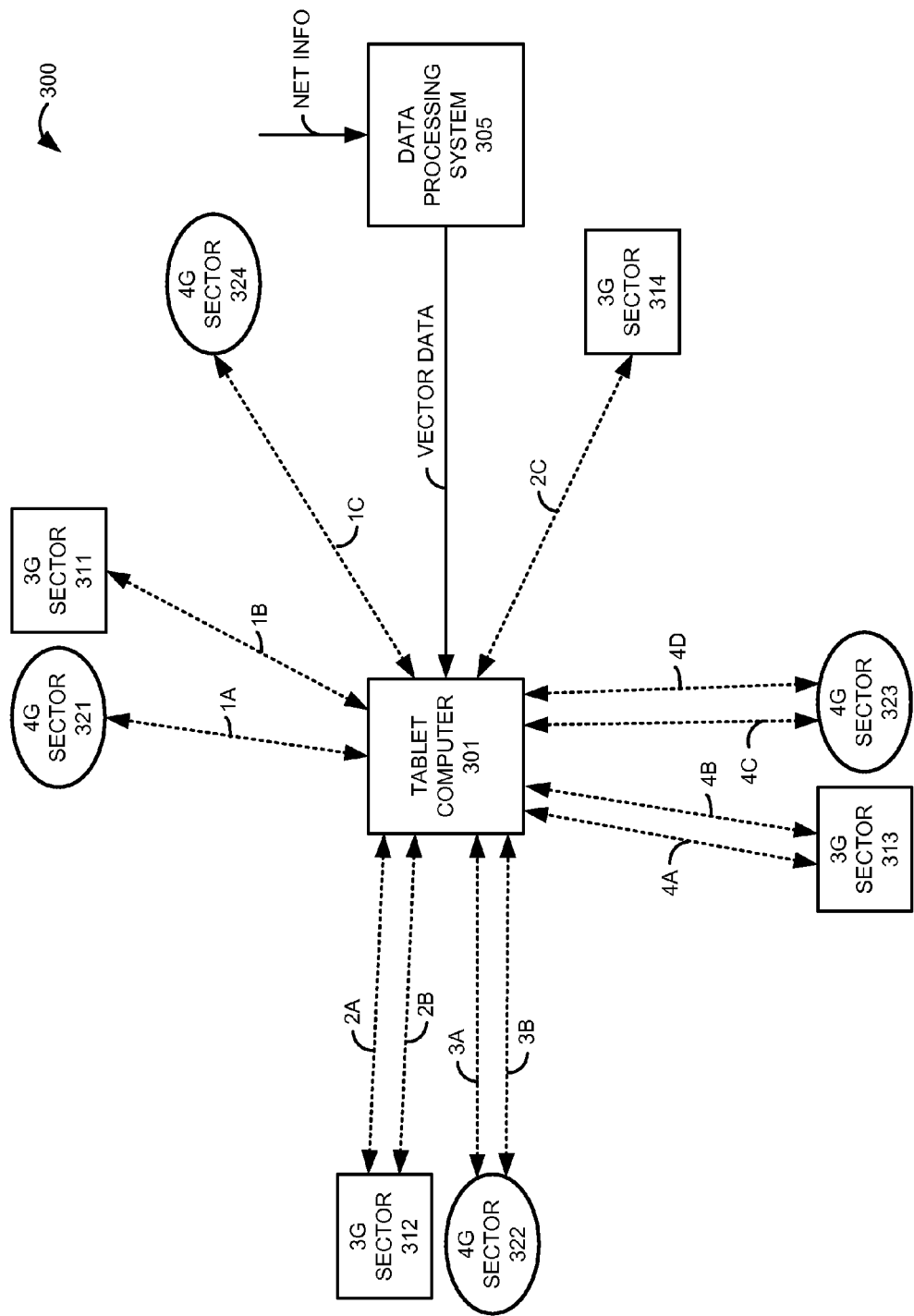
FIG. 3 illustrates a communication system that uses offload vectors to control device offloads between wireless carrier frequencies.

FIG. 3 illustrates communication system 300 that uses offload vectors to control device offloads between wireless carrier frequencies. Communication system 300 comprises tablet computer 301, data processing system 305, 3G sectors 311-314, and 4G sectors 321-324. Sectors 311-314 and 321-324 comprise base station systems that serve a specific geographic area (sector) proximate to the base station site. The number and arrangement of sectors on FIG. 3 is generalized for clarity.

The various base station carriers available to tablet computer 301 are indicated by dotted lines and are referenced by frequency band and channel. For example, the carrier from 4G sector 321 is labeled "1A" for frequency band 1 and frequency channel A. The frequency bands are typically larger segments of spectrum centered on carrier frequencies, such as 700 MHz, 800 MHz, 1700 MHz, 1900 Mhz, 2500 MHz, and the like. The frequency channels are sub-segments of a frequency band and are sometimes referred to as sub-carriers. The 3G carriers that are available to tablet computer 301 from 3G base stations 311-314 might use EVDO, HSPA, or some other third generation wireless protocol. The 4G carriers that are available to tablet computer 301 from 4G base stations 321-324 might use LTE, WiMAX, or some other fourth generation wireless protocol.

Data processing system 305 receives network information related to location, range, and loading per time for the base station carriers. Data processing system 305 processes the network information to develop offload vectors for each 3G carrier. Data processing system 305 transfers offload vector data structure for delivery to tablet computer 301. Tablet computer 301 processes the offload vectors when switching (or not) from the 3G carriers to the 4G carriers. For example, the offload vector for carrier 2A on 3G base station 312 might indicate to computer 301 that an offload to one of the 4G carriers should be avoided at the current time, but would be available in another 30 minutes.

Figure 4:
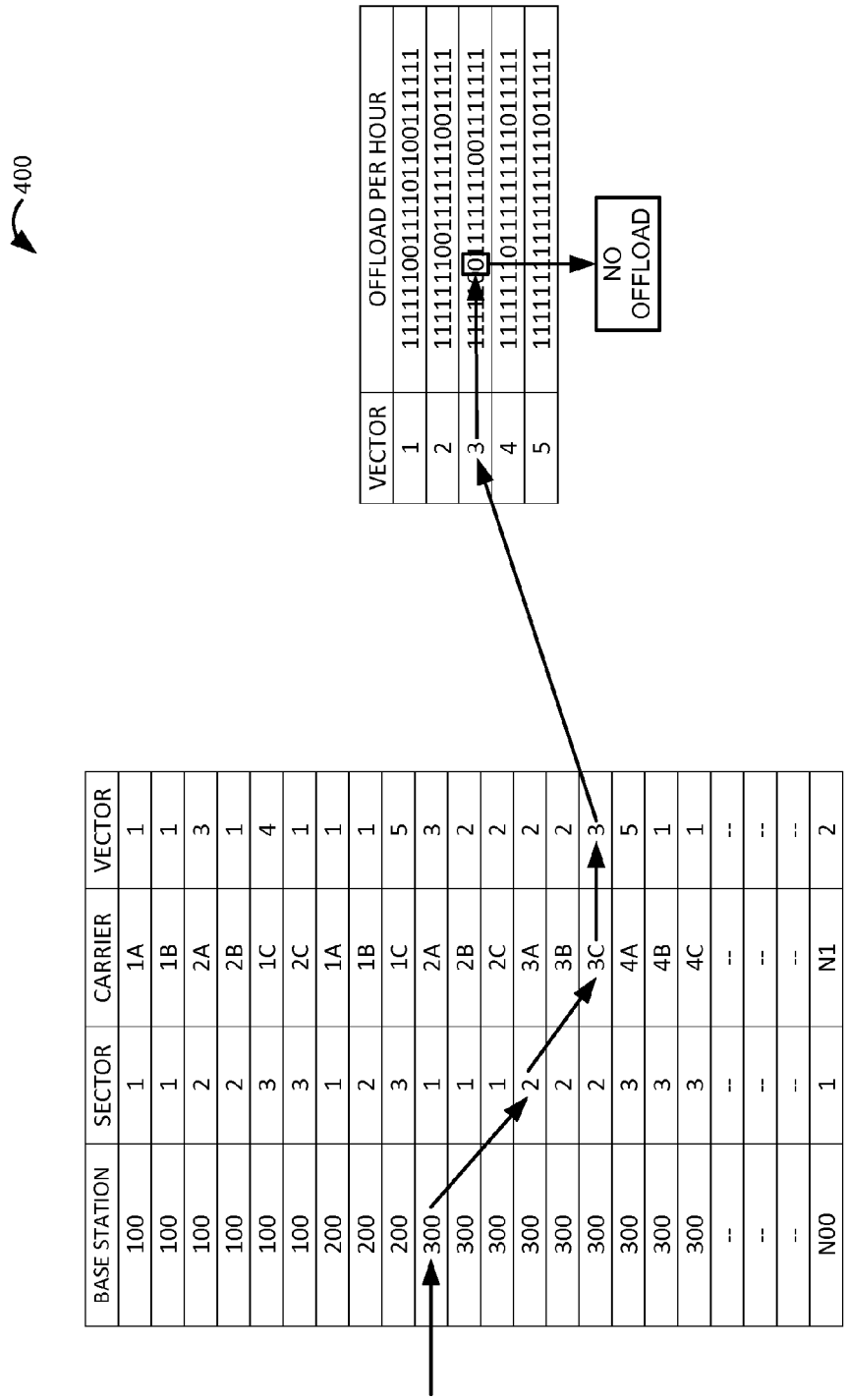
FIG. 4 illustrates a data structure having shared offload vectors to control device offloads between wireless carrier frequencies.

FIG. 4 illustrates data structure 400 having shared offload vectors to control device offloads between wireless carrier frequencies. Data structure 400 represents one of the data structures described herein, although these other data structures may use different configurations. The columns for base station, sector, and carrier identify a specific base station carrier. In some cases, a geographical data column could be added and used to key into the base station column. Each base station carrier is associated with one of five offload vectors by number 1-5. Data structure 400 also includes the five associated offload vectors.

Each of the five offload vectors comprises a 24-bit string that indicates offload availability per hour in a 24 hour day. Each bit location represents an hour starting at midnight, so the seventh bit represents the offload availability to a 4G carrier at 6:00 AM. Consider an example where a wireless phone is being served by sector 2 of base station 300 over carrier 3C at 6:00 AM, and the signal strength begins to fade. The arrows on FIG. 4 show how the wireless phone traverses data structure 400 to identify offload vector 3 having a 0 bit (no offload) in the 6:00 AM bit location. Thus, the wireless phone would not offload to a 4G carrier and would likely seek another 3G carrier. Had the bit in the 6:00 AM position been a 1 time been 7:00 AM, then the wireless phone would have initiated the offload from the 3G carrier to the 4G carrier.

Note that wild card symbols may be used as well to indicate a "don't care" condition for the offload. Also note that the offload from 3G to 4G is exemplary, and offloads from 4G to 3G could be accomplished in a similar manner.

Figure 5:
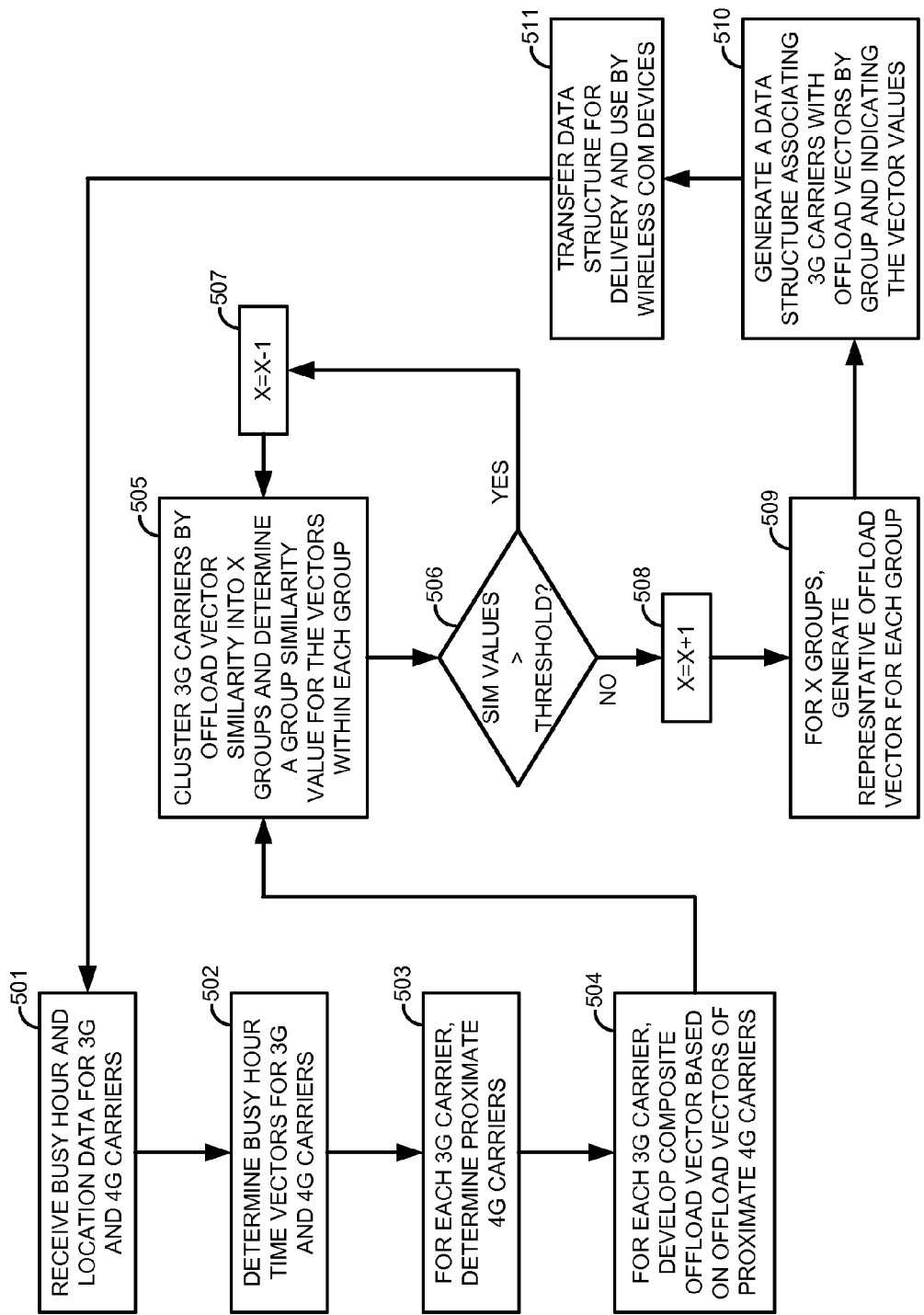
FIG. 5 illustrates the operation of a data processing system to generate a data structure having shared offload vectors to control device offloads between wireless carrier frequencies.

FIG. 5 illustrates the operation of a data processing system to generate data structure 400. The data processing system receives busy hour and location information for 3G and 4G carriers (501). The system determines busy hour vectors for each 3G and 4G carrier, such as 24-bit strings representing 24 hours with a 1=busy hour and a 0=non-busy hour (502). For each 3G carrier, the system determines the proximate 4G carriers based on the range and location of the base station carriers (503).

For each 3G carrier, the data processing system develops a composite busy hour vector based on the busy hour vectors of the 3G carrier and the proximate 4G carriers (504). Various techniques may be used to develop the composite vectors. In one example, the 24-bit string for the 3G carrier is compared to the bit strings of the proximate 4G carriers on a bit-by-bit (hour-by-hour) basis as follows:

3G busy hour (1) and 4G busy hour (1)=no offload (1);
  3G busy hour (1) and 4G non-busy hour (0)=offload desired (0);
  3G non-busy hour (0) and 4G busy hour (1)=no offload* (1); and
  3G non-busy hour (0) and 4G non-busy hour (0)=offload desired* (0).
*could be a don't care indication The set of bit-string comparisons generates a corresponding set of bit values for each hour, and the majority bit value at each hour is used for the composite vector. Alternative logic could be if desired, such as requiring at least two available carriers (instead of a majority) to allow an offload at a given hour.

The data processing system then clusters the composite busy hour vectors into a number of carrier groups (X) based on vector similarity (505). The number of groups (X) is set at a high-end value for the desired number of shared offload vectors. The data processing system then generates a similarity value for the composite busy hour vectors in each carrier group (505). If each of the similarity values for the carrier groups are each greater than a similarity threshold (506), then the number of groups (X) is reduced (507) and the clustering process is repeated for the lower number (X) (505). The number of groups (X) is reduced in this manner until a similarity value for at least one of the carrier groups falls below the similarity threshold. The number of carrier groups (X) is then increased back to the lowest number (X) that had sufficient vector similarity within all of the carrier groups (508).

The data processing system then generates (X) representative offload vectors—one for each of the carrier groups (509). The representative offload vectors are typically the most common composite offload vector in the group, although other criteria could be used. The data processing system generates a data structure that includes the representative offload vectors and that associates the individual 3G carriers with the representative offload vector for their carrier group (510). The data processing system transfers the data structure for delivery and use by wireless communication devices as described herein (511). The process may then repeat as new base station carrier and usage data becomes available (501).

Figure 6:
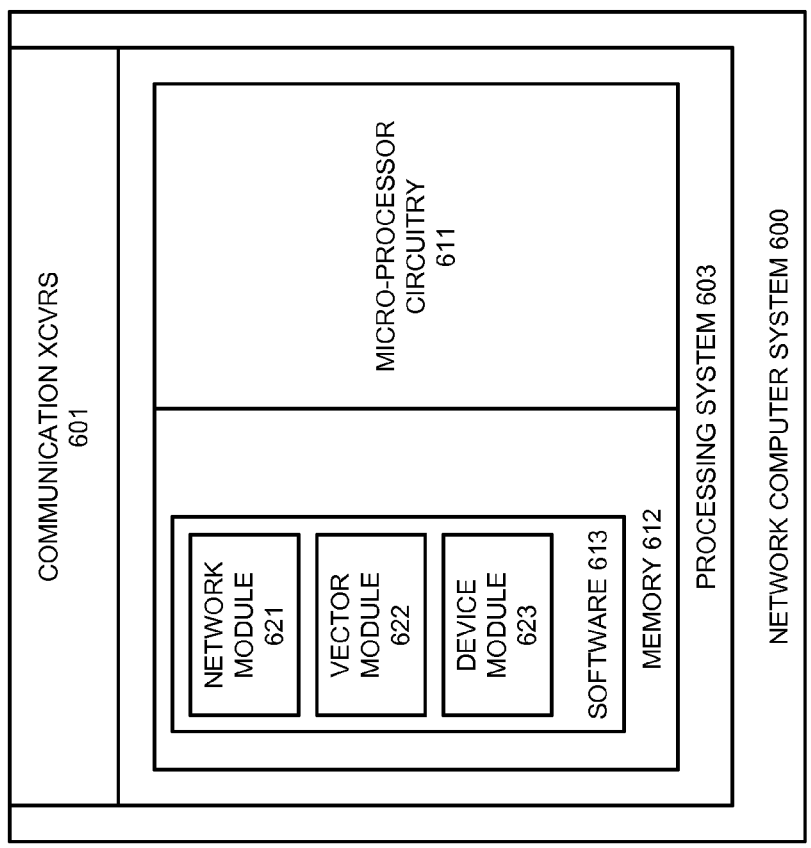
FIG. 6 illustrates a network computer system to generate data structures with shared offload vectors to control base station carrier offloads.

FIG. 6 illustrates network computer system 600 to generate data structures with shared offload vectors to control base station carrier offloads. Network computer system 600 is an example of the data processing systems described herein, although these systems may use alternative configurations. Network computer system 600 comprises communication transceivers 601 and processing system 603. Processing system 603 comprises micro-processing circuitry 611 and memory 612. Memory 612 stores software 613. Network computer system 600 may be integrated into a single platform or may be distributed across multiple diverse computer and communication systems. For example, network computer system 600 might be integrated within a Mobility Management Entity (MME), eNodeB, Access Network Discovery and Selection Function (ANDSF), and/or some other LTE system. Some conventional aspects of network computer system 600 are omitted for clarity, such as power supplies, enclosures, and the like.

Communication transceivers 601 comprise communication components, such as ports, circuitry, memory, software, and the like. Communication transceivers 601 typically utilize Ethernet, Internet, or some other networking protocol suitable for network information systems—including combinations thereof.

Micro-processor circuitry 611 comprises circuit boards that hold integrated circuitry and associated electronics. Memory 612 comprises non-transitory, computer-readable, data storage media, such as flash drives, disc drives, and the like. Software 613 comprises computer-readable instructions that control the operation of micro-processor circuitry 611 when executed. Software 613 includes modules 621-623 and may also include operating systems, applications, utilities, databases, and the like. Micro-processor circuitry 611 and memory 612 may be integrated into a single computer system or may be distributed across multiple computer systems. All or portions of software 613 may be externally stored on flash drives, discs, servers, and the like.

When executed by circuitry 611, network module 621 directs circuitry 611 to receive and process network information for subsequent offload vector generation. When executed by circuitry 611, vector module 622 directs circuitry 611 to process the network information to develop the offload vectors as described herein. When executed by circuitry 611, device module 623 directs circuitry 611 to generate and transfer data structures to control carrier offloads as described herein.

Figure 7:
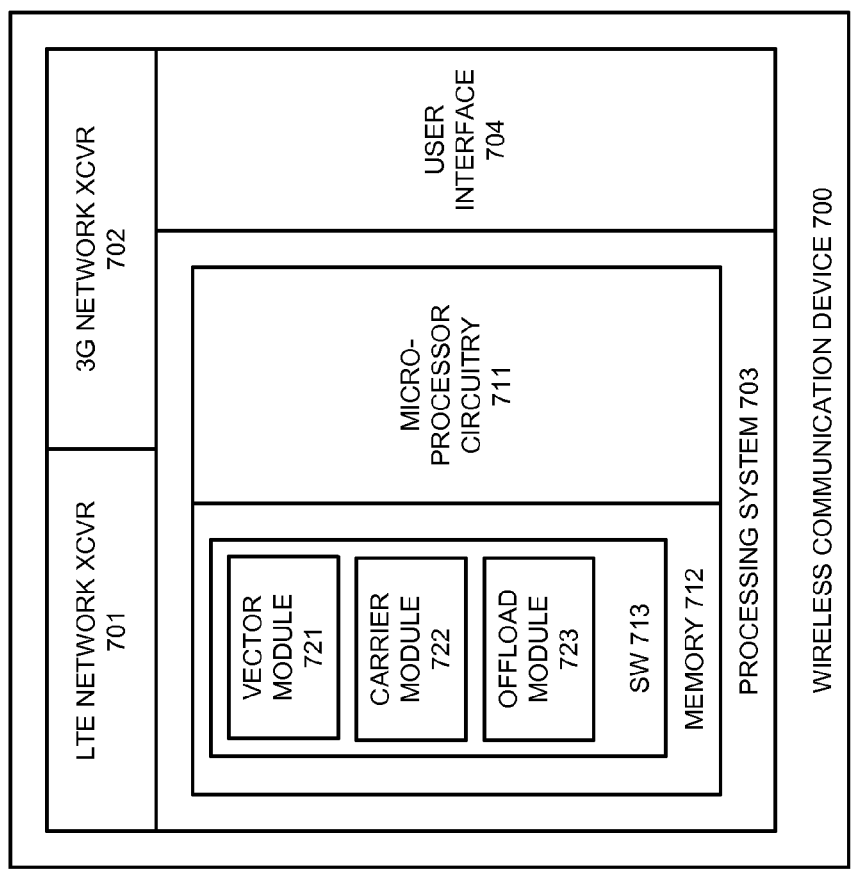
FIG. 7 illustrates a wireless communication device that uses a data structure with shared offload vectors to control base station carrier offloads.

FIG. 7 illustrates wireless communication device 700 that uses a data structure with shared offload vectors to control base station carrier offloads. Wireless communication device 700 is an example of user communication devices 101-104 and 301 although these devices may use alternative configurations and operations. Wireless communication device 700 comprises LTE network transceiver 701, 3G network transceiver 702, processing system 703, and user interface 704. Processing system 703 comprises micro-processing circuitry 711 and memory 712. Memory 712 stores software 713. Some conventional aspects of wireless communication device 700 are omitted for clarity, such as power supplies, enclosures, and the like. Wireless communication device 700 may be integrated into other systems or devices.

LTE network transceiver 701 and 3G transceiver 702 each comprise communication components, such as circuitry, memory, software, antennas, amplifiers, filters, modulators, signal processors, and the like. In some examples, the radio communications include multiple transceiver sub-systems for near-field, local network, and wide-area network data communications. LTE network transceiver 701 and 3G transceiver 702 communicate over various wireless base station carriers as described herein.

User interface 704 includes components to interact with a human operator, such as a touch display, speaker, microphone, camera, buttons, and switches. User interface 704 may be omitted in some examples.

Micro-processor circuitry 711 comprises one or more circuit boards that hold integrated circuit chips and associated electronics. Memory 712 comprises non-transitory data storage media, such as flash drives, disc drives, and the like. Software 713 comprises computer-readable instructions that control the operation of micro-processor circuitry 711 when executed. Software 713 includes modules 721-723 and may also include additional operating systems, applications, utilities, databases, and the like. All or portions of software 713 may be externally stored on flash drives, discs, servers, and the like.

When executed by circuitry 711, vector module 721 directs circuitry 711 to receive and store a data structure to control carrier selection. When executed by circuitry 711, carrier module 722 directs circuitry 711 to select 3G carriers for 3G transceiver 702. When executed by circuitry 711, offload module 723 directs circuitry 711 to offload (or not) from the selected 3G carrier to a 4G carrier on LTE transceiver 701.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data processing system to control wireless communication devices, the method comprising:
    determining offload vectors for first base station carriers in a first wireless communication network, wherein the offload vectors indicate offload availability per time frame for wireless communication device offloads from the first base station carriers to second base station carriers in a second wireless communication network;
    determining offload vector similarity among the first base station carriers to group the first base station carriers into a lowest number of carrier groups to maintain the offload vector similarity within the carrier groups above a similarity threshold;
    generating a data structure that associates the first base station carriers with representative offload vectors for their carrier groups; and
    transferring the data structure for delivery to the wireless communication devices.

2. The method of claim 1 wherein the wireless communication devices use the data structure to offload from one of the first base station carriers to one of the second base station carriers during a non-busy hour for the one of the second base station carriers.

3. The method of claim 1 wherein the wireless communication devices use the data structure to inhibit offloading from one of the first base station carriers to one of the second base station carriers during a busy hour for the one of the second base station carriers.

4. The method of claim 1 wherein the offload vectors each comprise a sequence of bits having bit values indicating the offload availability and having bit locations indicating the time frame.

5. The method of claim 1 wherein determining the offload vectors comprises determining geographic proximities of the first base station carriers to the second base station carriers.

6. The method of claim 1 wherein determining the offload vectors comprises comparing busy hours between individual ones of the first base station carriers and geographically proximate ones of the second base station carriers.

7. The method of claim 1 wherein determining the offload vector similarity comprises determining the offload vector similarity for a plurality of different numbers of the carrier groups.

8. The method of claim 1 wherein the base station carriers comprise different wireless base station and carrier frequency combinations.

9. The method of claim 1 the base station carriers comprise different base station sector and carrier frequency combinations.

10. The method of claim 1 wherein the second wireless communication network comprises a Long Term Evolution (LTE) network.

11. A communication system to control device offloads comprising:
    a data processing system configured to determine offload vectors for first base station carriers in a first wireless communication network, wherein the offload vectors indicate offload availability per time frame for wireless communication device offloads from the first base station carriers to second base station carriers in a second wireless communication network, to determine offload vector similarity among the first base station carriers to group the first base station carriers into a lowest number of carrier groups to maintain the offload vector similarity within the carrier groups above a similarity threshold, to generate and transfer a data structure that associates the first base station carriers with representative offload vectors for their carrier groups; and
    a plurality of wireless communication devices that are configured to receive and process the data structure to control the offloads from the first base station carriers to second base station carriers.

12. The communication system of claim 11 wherein the wireless communication devices are configured to use the data structure to offload from one of the first base station carriers to one of the second base station carriers during a non-busy hour for the one of the second base station carriers.

13. The communication system of claim 11 wherein the wireless communication devices are configured to use the data structure to inhibit offloading from one of the first base station carriers to one of the second base station carriers during a busy hour for the one of the second base station carriers.

14. The communication system of claim 11 wherein the offload vectors each comprise a sequence of bits having bit values indicating the offload availability and having bit locations indicating the time frame.

15. The communication system of claim 11 wherein the data processing system is configured to determine geographic proximities of the first base station carriers to the second base station carriers.

16. The communication system of claim 11 wherein the data processing system is configured to compare busy hours between individual ones of the first base station carriers and geographically proximate ones of the second base station carriers.

17. The communication system of claim 11 wherein the data processing system is configured to determine the offload vector similarity for a plurality of different numbers of the carrier groups.

18. The communication system of claim 11 wherein the base station carriers comprise different wireless base station and carrier frequency combinations.

19. The communication system of claim 11 wherein the base station carriers comprise different base station sector and carrier frequency combinations.

20. The communication system of claim 11 wherein the second wireless communication network comprises a Long Term Evolution (LTE) network.

* * * * *